United States Patent
Iwamura et al.

(10) Patent No.: US 8,676,164 B2
(45) Date of Patent: Mar. 18, 2014

(54) MOBILE COMMUNICATION SYSTEM, MOBILE STATION, AND RADIO BASE STATION USING A CARRIER AGGREGATION SECURITY PROCESS

(75) Inventors: Mikio Iwamura, Tokyo (JP); Wuri Andarmawanti Hapsari, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 29 days.

(21) Appl. No.: 13/383,731

(22) PCT Filed: Jul. 2, 2010

(86) PCT No.: PCT/JP2010/061352
§ 371 (c)(1),
(2), (4) Date: Mar. 9, 2012

(87) PCT Pub. No.: WO2011/007686
PCT Pub. Date: Jan. 20, 2011

(65) Prior Publication Data
US 2012/0157053 A1 Jun. 21, 2012

(30) Foreign Application Priority Data
Jul. 16, 2009 (JP) ................ P2009-168130

(51) Int. Cl.
*H04M 1/66* (2006.01)
(52) U.S. Cl.
USPC ........ 455/411; 455/410; 455/450; 455/452.1; 455/509; 370/329; 370/341; 713/171; 380/247
(58) Field of Classification Search
USPC .............. 455/410, 411, 422.1, 450–455, 464, 455/509, 436–444; 380/247–250, 277–30; 713/162, 171; 370/339, 341–348, 370/431–463, 321–337
See application file for complete search history.

(56) References Cited

U.S. PATENT DOCUMENTS 7,418,043 B2 * 8/2008 Shattil ................ 375/260

FOREIGN PATENT DOCUMENTS

| JP | 2005-20076 A | 1/2005 |
| JP | 2006-352225 A | 12/2006 |

OTHER PUBLICATIONS

3GPP TS 36.300 V8.9.0 (Jun. 2009): 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), hereinafter TS36.300.*
3GPP TS 33.401 V9.0.0 (Jun. 2009): 3rd Generation Partnership Project; Technical Specification Group Services and System Aspects; 3GPP System Architecture Evolution (SAE): Security architecture; (Release 9), hereinafter TS33.401.*
3GPP TSG-RAN1 #57 R1-091966 San Francisco, USA, May 4 to 8, 2009 Agenda Item 15.4 Source: Fujitsu Title: Anchor component carrier document for discussion, hereinafter R1-091966.*
Office Action for Japanese Application No. 2009-168130 mailed Jan. 17, 2012, with English translation thereof (5 pages).

(Continued)

*Primary Examiner* — Patrick Edouard
*Assistant Examiner* — Ronald Eisner
(74) *Attorney, Agent, or Firm* — Osha Liang LLP

(57) ABSTRACT

A mobile communication system according to the present invention is a mobile communication system so configured that a mobile station UE performs communication with a radio base station eNB by simultaneously using a plurality of frequency carriers, in which the mobile station UE is configured to perform a communication security process by applying the same key KeNB to all of the plurality of frequency carriers.

12 Claims, 4 Drawing Sheets

(56) References Cited

OTHER PUBLICATIONS

3GPP TSG-RAN1 #57, R1-091966; "Anchor Component Carrier", San Francisco, US, May 4, 2009 (4 pages).
3GPP TS 33.401 v9.0.0, "Technical Specification Group Services and System Aspects"; Jun. 2009 (104 pages).
3GPP TS 33.401 V11.1.0, Sep. 2011, "3rd Generation Partnership Project; Technical Specification Group Services and System Aspects; 3GPP System Architecture Evolution (SAE); Security architecture (Release 11)," 123 pages.
3GPP TS 36.331 V10.3.0, Sep. 2011, "3rd Generation Partnership Project; Technical Specification Group Radio Access Network; Evolved Universal Terrestrial Radio Access (E-UTRA); Radio Resource Control (RRC); Protocol specification (Release 10)," 296 pages.
International Search Report issued in PCT/JP2010/061352, mailed on Aug. 3, 2010, with translation, 2 pages.
Office Action for Australian Application No. 2010271918 dated Jun. 12, 2013 (3 pages).
Office Action for Korean Application No. 10-2012-7002356 dated Mar. 6, 2013, with English translation thereof (9 pages).
Office Action for Chinese Application No. 201080031950.0, mailed Nov. 23, 2012, with English translation thereof (13 pages).
3GPP TSG-RAN1 WG2 Meeting #66bis, R2-093721, "L3 Anchor Carrier," Los Angeles, USA, Jun. 29-Jul. 3, 2009 (2 pages).

* cited by examiner

MOBILE COMMUNICATION SYSTEM, MOBILE STATION, AND RADIO BASE STATION USING A CARRIER AGGREGATION SECURITY PROCESS

TECHNICAL FIELD

The present invention relates to a mobile communication system, a mobile station, and a radio base station.

BACKGROUND ART

In a mobile communication system employing an LTE (Long Term Evolution)-Advanced scheme which is a next-generation communication scheme of an LTE scheme, it is possible to use a technology called "Carrier Aggregation" in which a mobile station UE communicates with a radio base station eNB by simultaneously using a plurality of frequency carriers.

The frequency carriers constituting the "Carrier Aggregation" are called "Component Carriers".

Each "Component Carrier" may also serve as an independent LTE cell. That is, it may be possible to perform the "Carrier Aggregation" employing the LTE cell, which uses different frequency carriers, as "Component Carriers".

Consequently, in the LTE-Advanced scheme, based on the "Carrier Aggregation", it is possible to perform communication by simultaneously using a plurality of LTE cells using different frequency carriers.

Here, in the LTE scheme, a key KeNB used in a radio security process depends on both PCI (Physical Cell Identity, a physical cell ID) and "E-ARFCN (E-UTRA Absolute Radio Frequency Channel Number, a frequency code)" of a cell in communication.

This is for using a key generation function KDF (Key Derivation Function) using the PCI and the E-ARFCN as parameters when generating the key KeNB.

Furthermore, the key KeNB is generated from a master key KASME different for each mobile station UE. Therefore, in the LTE scheme, the key KeNB is a cell specific key and a mobile station UE specific key.

SUMMARY OF THE INVENTION

Problems to be Solved by the Invention

However, in the LTE-Advanced mobile communication system, the radio security process in the "Carrier Aggregation" has not been defined.

Therefore, the present invention has been achieved in view of the above-described problems, and an object thereof is to provide a mobile communication system, a mobile station, and a radio base station, capable of appropriately performing a radio security process in "Carrier Aggregation".

Means for Solving the Problem

A gist of a first characteristic of the present invention is a mobile communication system in which a mobile station is configured to communicate with a radio base station by using a plurality of frequency carriers, in which the mobile station is configured to perform a security process of communication by applying a same key to all of the plurality of frequency carriers.

A gist of a second characteristic of the present invention is a mobile station, comprising a communication unit configured to communicate with a radio base station by simultaneously using a plurality of frequency carriers, in which the communication unit is configured to perform a security process of communication by applying a same key to all of the plurality of frequency carriers.

A gist of a third characteristic of the present invention is a radio base station comprising: a communication unit configured to communicate with a mobile station by simultaneously using a plurality of frequency carriers, in which the communication unit is configured to perform a security process of communication by applying a same key to all of the plurality of frequency carriers.

Effect of the Invention

As described above, according to the present invention, it is possible to provide a mobile communication system, a mobile station, and a radio base station, capable of appropriately performing a radio security process in "Carrier Aggregation".

BEST MODES FOR CARRYING OUT THE INVENTION (Mobile Communication System According to First Embodiment of the Present Invention)

Figure 1:
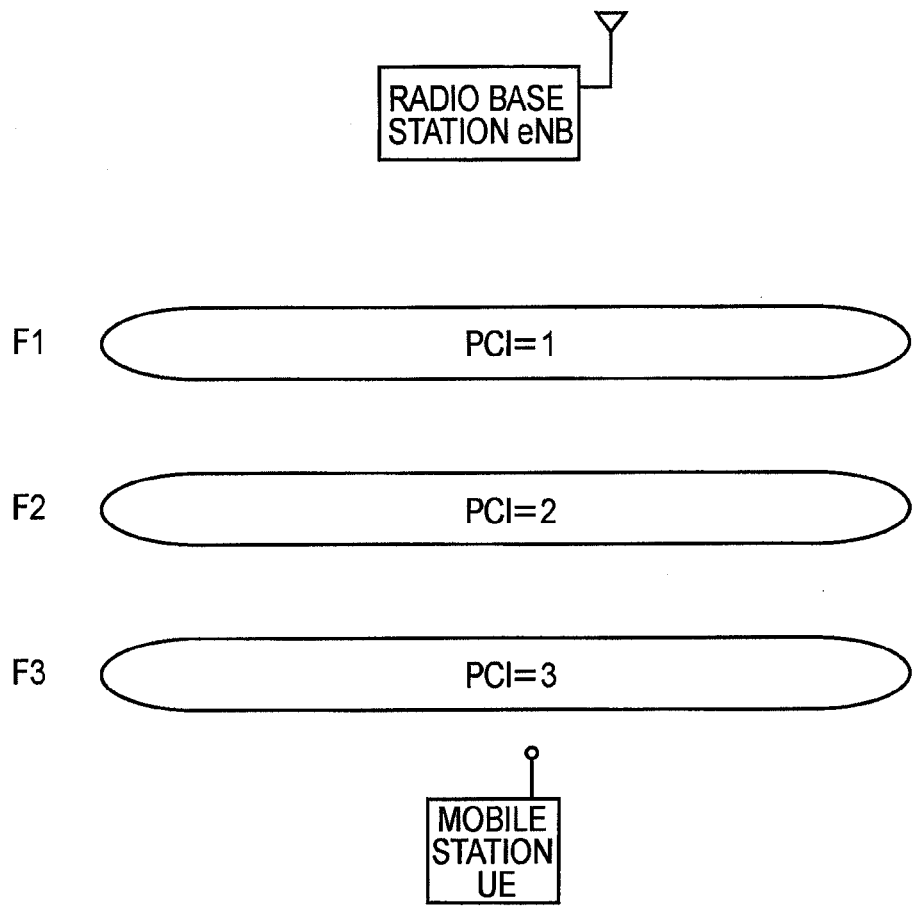
FIG. 1 is a diagram showing the entire configuration of a mobile communication system according to a first embodiment of the present invention.
Figure 2:
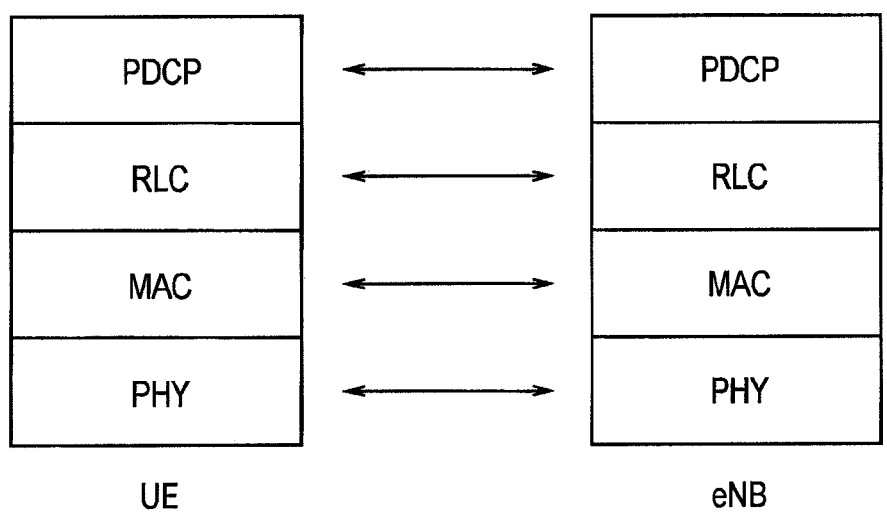
FIG. 2 is a protocol stack diagram of the mobile communication system according to the first embodiment of the present invention.
Figure 3:
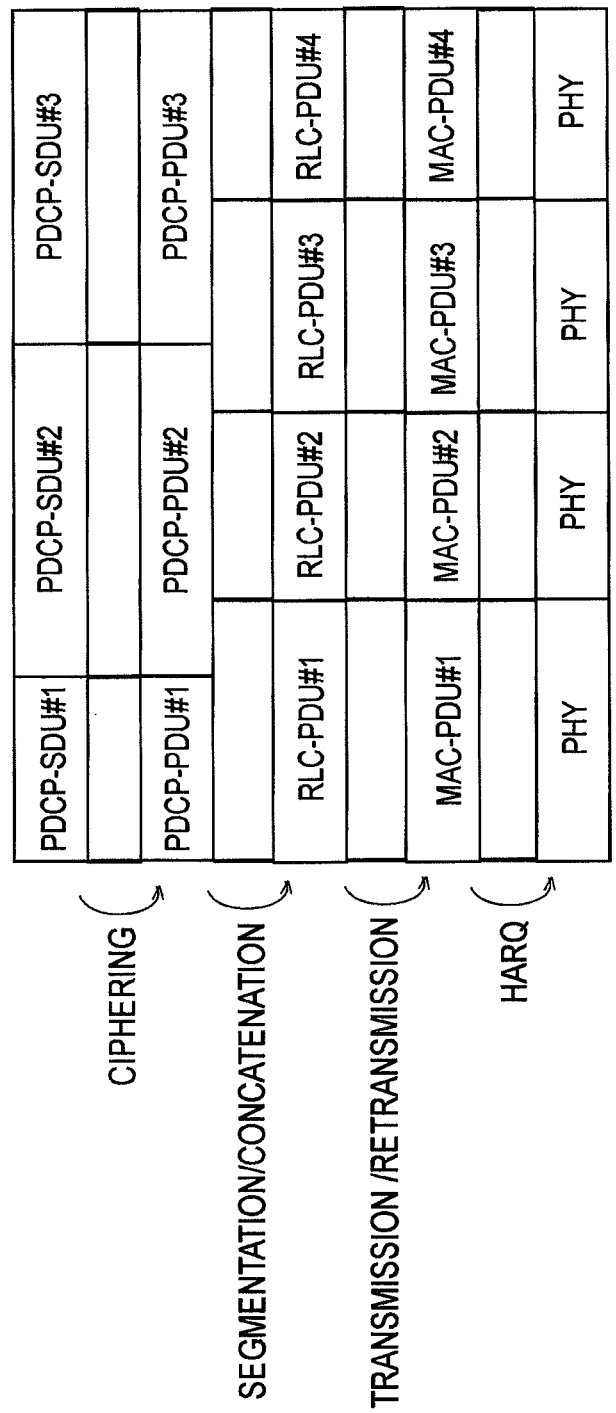
FIG. 3 is a diagram explaining an example in which three PDCP-SDUs are transmitted in a mobile communication system according to the first embodiment of the present invention.

With reference to FIG. 1 to FIG. 3, the mobile communication system according to the first embodiment of the present invention will be described.

The mobile communication system according to the present embodiment is an LTE-Advanced mobile communication system. In the mobile communication system, it is possible for a mobile station UE to communicate with a radio base station eNB by simultaneously using a plurality of frequency carriers, that is, "Carrier Aggregation" is available.

In the present embodiment, as illustrated in FIG. 1, it is possible for the mobile station UE to perform communication by simultaneously using a frequency carrier F1 in a cell #1 specified by "PCI (Physical Cell ID)=1", a frequency carrier F2 in a cell #2 specified by "PCI=2", and a frequency carrier F3 in a cell #3 specified by "PCI=3".

Here, it is assumed that all the cell #1 to the cell #3 are cells subordinate to the radio base station eNB. In addition, the cell #1 to the cell #3 may also be independent LTE cells, respectively.

As illustrated in FIG. 2, in the mobile communication system according to the present embodiment, the mobile station UE and the radio base station eNB have a physical (PHY) layer function, an MAC (Media Access Control) layer function, an RLC (Radio Link Control) layer function, and a PDCP (Packet Data Convergence Protocol) layer function.

The PDCP layer function is configured to perform a radio security process in communication between the mobile station UE and the radio base station eNB.

Furthermore, the RLC layer function is configured to perform retransmission control in an RLC layer, and the MAC layer function is configured to perform HARQ retransmission control.

FIG. 3 illustrates an example in which three PDCP-SDUs #1 to #3 are transmitted.

As illustrated in FIG. 3, firstly, the PDCP layer function performs a encryption process with respect to PDCP-SDUs #1 to #3 of a U-plane to generate PDCP-PDUs #1 to #3, and hands over the PDCP-PDUs #1 to #3 to the RLC layer function.

Meanwhile, in addition to the encryption process, the PDCP layer function adds an MAC-I for an integrity protection process to PDCP-SDUs #1 to #3 of a C-plane to generate PDCP-PDUs #1 to #3, and hands over the PDCP-PDUs #1 to #3 to the RLC layer function.

Secondly, the RLC layer function performs a segmentation process (Segmentation) or a concatenation process (Concatenation) in order to generate RLC-PDUs #1 to #4 of TBS (Transmission Block Size) specified by scheduler, thereby adding RLC headers.

In addition, when the RLC layer function is being activated in an AM mode, the RLC layer function performs retransmission control in the RLC layer.

Thirdly, the RLC layer function hands over the generated RLC-PDUs #1 to #4 to the MAC layer function.

Fourthly, the MAC layer function adds MAC headers to the RLC-PDUs #1 to #4 to generate MAC-PDUs #1 to #4, and transmits the MAC-PDUs #1 to #4 to the physical layer function by using HARQ retransmission control.

Figure 4:
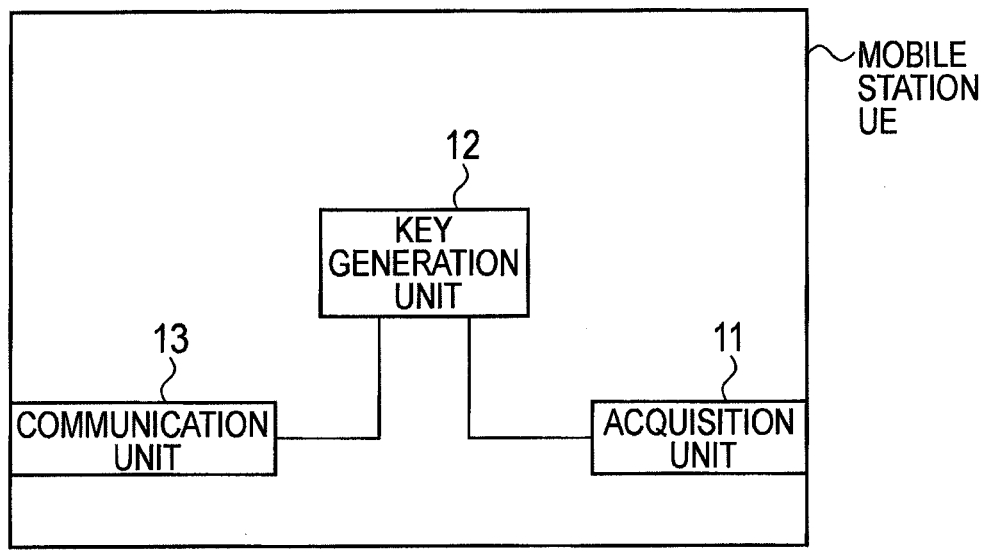
FIG. 4 is a functional block diagram of a mobile station according to the first embodiment of the present invention.

As illustrated in FIG. 4, the mobile station UE includes an acquisition unit 11, a key generation unit 12, and a communication unit 13.

The acquisition unit 11 is configured to acquire "PCI" for designating each cell subordinate to the radio base station eNB, and "E-ARFCN (E-UTRA Absolute Radio Frequency Channel Number)" for designating a frequency carrier used in each cell from the radio base station eNB.

The key generation unit 12 is configured to generate a key KeNB based on the "PCI" and the "E-ARFCN" acquired by the acquisition unit 11.

For example, the key generation unit 12 may also be configured to generate the key KeNB by a key generation function KDF (the PCI and the E-ARFCN).

Here, the key KeNB is a key for generating keys (KUPenc, KRRCenc, and KRRCint) used in the radio security process in the PDCP layer function.

The KUPenc is a key for the encryption process of the U-plane, the KRRCenc is a key for the encryption process of the C-plane, and the KRRCint is a key for the integrity protection process of the C-plane, wherein all these keys are generated from the key KeNB.

In addition, when the "Carrier Aggregation" is used, the key generation unit 12 is configured to generate one key KeNB to be applied to all of a plurality of frequency carriers.

Furthermore, when the "Carrier Aggregation" is used, the key generation unit 12 is configured to generate a set of keys (KUPenc, KRRCenc, and KRRCint), which are to be applied to all of the plurality of frequency carriers, with respect also to the keys (KUPenc, KRRCenc, and KRRCint) used in the radio security process in the PDCP layer function.

That is, when the "Carrier Aggregation" is used, the key generation unit 12 is configured to generate the key KeNB based on "PCI" and "E-ARFCN" of any one of the plurality of frequency carriers, specifically, based on "PCI" and "E-ARFCN" of "Anchor Carrier".

Here, one "Anchor Carrier" is determined from the plurality of frequency carriers constituting the "Carrier Aggregation".

For example, the "Anchor Carrier" is set to the mobile station UE from the radio base station eNB at the time of "Connection Setup", at the time of "Security Mode Command", at the time of "Reconfiguration", at the time of "Intra-RAT Handover", at the time of "Inter-RAT Handover", at the time of "Re-establishment" and the like.

Otherwise, the "Anchor Carrier" may also be determined as a frequency carrier by which the mobile station UE has initially established an RRC connection.

In addition, when the "Anchor Carrier" is changed, the key generation unit 12 may also be configured to generate the above-mentioned key KeNB again based on "PCI" and "E-ARFCN" of the changed "Anchor Carrier".

When the "Anchor Carrier" is changed, an intra-eNB handover may be activated from the radio base station eNB. When the intra-eNB handover is instructed, the mobile station UE may change the "Anchor Carrier", and simultaneously update the key KeNB, and perform a reset process with respect to PHY, MAC, and RLC layers similar to an LTE handover.

The communication unit 13 is configured by the above-mentioned physical (PHY) layer function, MAC layer function, RLC layer function, and PDCP layer function, and is configured to communicate with the radio base station eNB by simultaneously using the plurality of frequency carriers.

In addition, algorithms of the encryption process and the integrity protection process used in the PDCP layer are configured to be the same in each of the plurality of frequency carriers.

The algorithm to be used is set to the mobile station UE from the radio base station eNB at the time of "Security Mode Command", at the time of "Reconfiguration", at the time of "Intra-RAT Handover", at the time of "Inter-RAT Handover", at the time of "Re-establishment" and the like.

Figure 5:
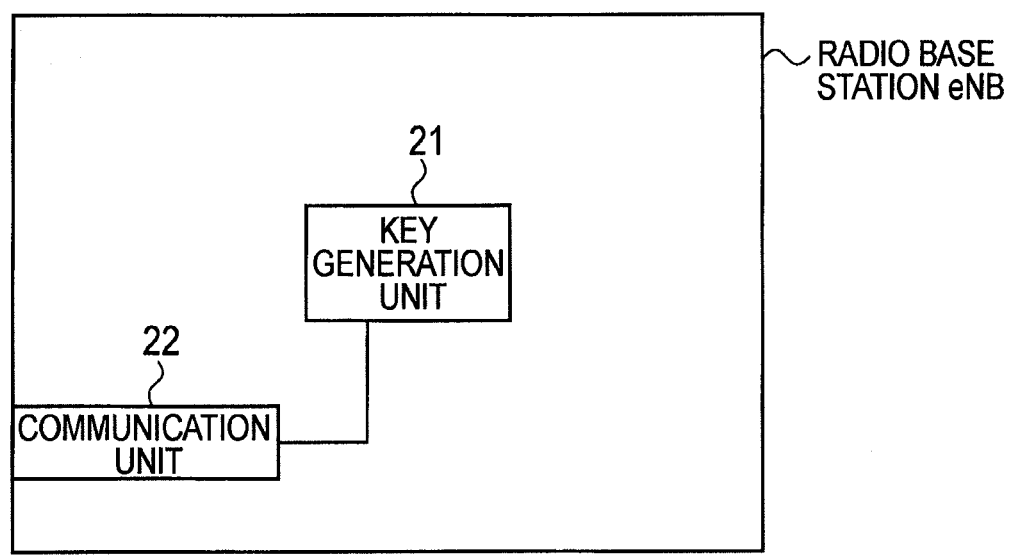
FIG. 5 is a functional block diagram showing a radio base station according to the first embodiment of the present invention.

As illustrated in FIG. 5, the radio base station eNB includes a key generation unit 21 and a communication unit 22. Here, the key generation unit 21 has the same function as that of the key generation unit 12 illustrated in FIG. 4, and the communication unit 22 has the same function as that of the communication unit 13 illustrated in FIG. 4.

Hereinafter, with reference to FIG. 6, the operation of the mobile communication system according to the present embodiment will be described.

Figure 6:
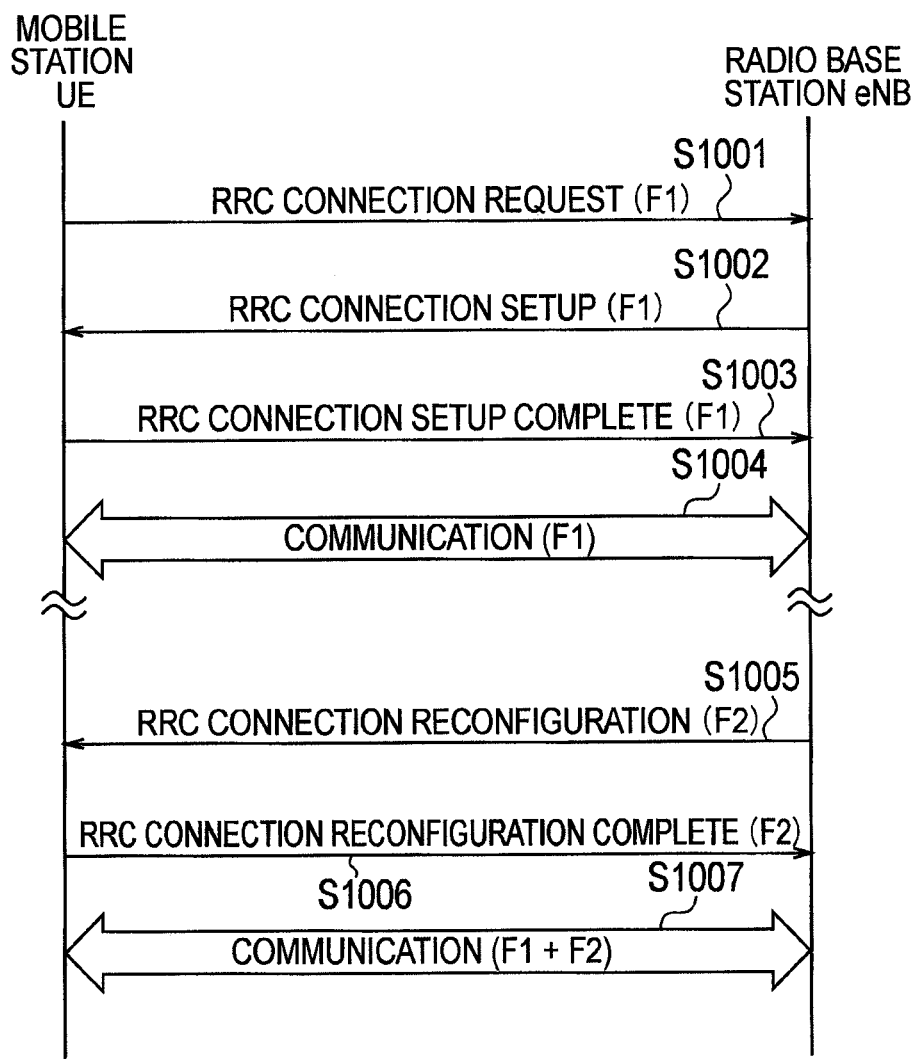
FIG. 6 is a sequence diagram showing an operation of the mobile communication system according to the first embodiment of the present invention.

As illustrated in FIG. 6, in step S1001, the mobile station UE transmits "RRC Connection Request" for requesting the establishment of communication (an RRC (Radio Resource Control) connection) between the mobile station UE and a cell #1 to the radio base station eNB.

In step S1002, the radio base station eNB transmits "RRC Connection Setup" for the "RRC Connection Request", which has been received in step S1001, to the mobile station UE.

In step S1003, the mobile station UE transmits "RRC Connection Setup Complete" to the radio base station eNB.

As a consequence, in step S1004, an RRC connection using a frequency carrier F1 is established between the mobile station UE and the radio base station eNB, and communication via the RRC connection starts.

Then, in step S1005, the radio base station eNB transmits "RRC Connection Reconfiguration" based on the RRC connection, which has been established using the frequency carrier F1, to the mobile station UE.

The "RRC Connection Reconfiguration" is for setting the addition of a frequency carrier F2 as a radio resource used in communication.

In step S1006, the mobile station UE transmits "RRC Connection Reconfiguration Complete" to the radio base station eNB.

As a consequence, in step S1007, communication simultaneously using the frequency carrier F1 and the frequency carrier F2 starts between the mobile station UE and the radio base station eNB.

Simultaneously, another frequency carrier is added, so that it is possible to perform communication simultaneously using three or more frequency carriers. Furthermore, it is possible to release some frequency carriers during communication, or change the number of frequency carriers.

In general, in the LTE-Advanced mobile communication system, when a remaining error exists in the HARQ retransmission control, retransmission control in the RLC layer is performed.

Here, in retransmission in the RLC layer, RLC-PDU may be retransmitted by "Component Carrier" different from that in initial transmission.

However, the RLC-PDU includes one or more PDCP-PDUs after a encryption process. Therefore, in the case of using a key KeNB depending on each frequency carrier by following the LTE scheme, the followings are considered.

When the RLC-PDU is to be retransmitted using "Component Carrier" different from that in initial transmission, it is assumed that the cipher of the PDCP layer should be released once, a encryption process corresponding to the "Component Carrier" used in retransmission should be performed again, and the RLC-PDU should be regenerated.

Furthermore, in the LTE-Advanced mobile communication system, when segments of the PDCP-PDU are transmitted through connections using different "Component Carriers", it is assumed to be very difficult for a reception side to perform a decoding process of the PDCP-PDU because keys used in a encryption process are different for each received segment of the PDCP-PDU.

However, in accordance with the mobile communication system according to the present invention, one key KeNB is used for a plurality of "Component Carriers" forming an RRC connection, so that it is possible to avoid the above-mentioned problems.

The above-mentioned characteristics of this embodiment may be expressed as follows.

A first characteristic of the present embodiment is summarized in that a mobile communication system in which a mobile station UE is configured to communicate with a radio base station eNB by simultaneously using a plurality of frequency carriers, wherein the mobile station UE is configured to perform a security process of communication by applying the same key KeNB to all the frequency carriers.

In the first characteristic of the present embodiment, the mobile station UE may also be configured to generate the key KeNB based on "PCI (a physical cell ID)" and "E-ARFCN (a frequency code)" of "Anchor Carrier (any one of the plurality of frequency carriers)".

In the first characteristic of the present embodiment, the same algorithm of a security process (a encryption process and an integrity prevention process) may also be configured to be used for all the above-mentioned frequency carriers.

In the first characteristic of the present embodiment, the "Anchor Carrier" may also be specified by the radio base station.

In the first characteristic of the present embodiment, when the "Anchor Carrier" is changed by the radio base station eNB, the mobile station UE may also be configured to generate the above-mentioned key KeNB based on "PCI" and "E-ARFCN" of the changed "Anchor Carrier".

A second characteristic of the present embodiment is summarized in that a mobile station UE includes a communication unit 13 configured to communicate with a radio base station eNB by simultaneously using a plurality of frequency carriers, wherein the communication unit 13 is configured to perform a security process of communication by applying the same key KeNB to all the frequency carriers.

In the second characteristic of the present embodiment, the mobile station UE may also include the key generation unit 12 configured to generate the key KeNB based on "PCI" and "E-ARFCN" of "Anchor Carrier".

In the second characteristic of the present embodiment, the communication unit 13 may also be configured to use the same algorithm of a security process (a encryption process and an integrity prevention process) for all the above-mentioned frequency carriers.

In the second characteristic of the present embodiment, the "Anchor Carrier" may also be specified by the radio base station eNB.

In the second characteristic of the present embodiment, when the "Anchor Carrier" is changed by the radio base station eNB, the key generation unit 12 may also be configured to generate the above-mentioned key KeNB based on "PCI" and "E-ARFCN" of the changed "Anchor Carrier".

A third characteristic of the present embodiment is summarized in that a radio base station eNB includes a communication unit 22 configured to communicate with a mobile station UE by simultaneously using a plurality of frequency carriers, wherein the communication unit 22 is configured to perform a security process of communication by applying the same key KeNB to all the frequency carriers.

In the third characteristic of the present embodiment, the mobile station UE may also include the key generation unit 21 configured to generate the key KeNB based on "PCI" and "E-ARFCN" of "Anchor Carrier".

In the third characteristic of the present embodiment, the communication unit 22 may also be configured to use the same algorithm of a security process (a encryption process and an integrity prevention process) for all the above-mentioned frequency carriers.

In the third characteristic of the present embodiment, when the "Anchor Carrier" is changed, the key generation unit 21 may also be configured to generate the above-mentioned key KeNB based on "PCI" and "E-ARFCN" of the changed "Anchor Carrier".

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication system comprising:
a mobile station configured to communicate with a radio base station by simultaneously using a plurality of frequency carriers, wherein
the mobile station is configured to perform a security process of communication by applying a same key to all of the plurality of frequency carriers, and
the mobile station is configured to generate the key based on a physical cell ID and a frequency code of either one of the plurality of frequency carriers.

2. The mobile communication system according to claim 1, wherein a same algorithm of the security process is applied to all of the plurality of frequency carriers.

3. The mobile communication system according to claim 1, wherein any one of the plurality of frequency carriers is an anchor carrier specified by the radio base station.

4. The mobile communication system according to claim 3, wherein, when the anchor carrier is changed by the radio base station, the mobile station is configured to generate the key based on a physical cell ID and a frequency code of the changed anchor carrier.

5. A mobile station, comprising:
a communication unit configured to communicate with a radio base station by simultaneously using a plurality of frequency carriers; and
a key generation unit configured to generate a key based on a physical cell ID and a frequency code of either one of the plurality of frequency carriers, wherein
the communication unit is configured to perform a security process of communication by applying the same key to all of the plurality of frequency carriers.

6. The mobile station according to claim 5, wherein the communication unit is configured to use a same algorithm of the security process for all of the plurality of frequency carriers.

7. The mobile station according to claim 5, wherein any one of the plurality of frequency carriers is an anchor carrier specified by the radio base station.

8. The mobile station according to claim 7, wherein, when the anchor carrier is changed by the radio base station, the key generation unit is configured to generate the key based on a physical cell ID and a frequency code of the changed anchor carrier.

9. A radio base station comprising:
a communication unit configured to communicate with a mobile station by simultaneously using a plurality of frequency carriers; and
a key generation unit configured to generate a key based on a physical cell ID and a frequency code of either one of the plurality of frequency carriers, wherein
the communication unit is configured to perform a security process of communication by applying the same key to all of the plurality of frequency carriers.

10. The radio base station according to claim 9, wherein the communication unit is configured to use a same algorithm of the security process for all of the plurality of frequency carriers.

11. The radio base station according to claim 9, wherein any one of the plurality of frequency carriers is an anchor carrier specified by the radio base station.

12. The radio base station according to claim 11, wherein, when the anchor carrier is changed, the key generation unit is configured to generate the key based on a physical cell ID and a frequency code of the changed anchor carrier.

* * * * *